Feb. 17, 1953
R. C. DEHMEL
2,628,434
AIRCRAFT TRAINING APPARATUS WITH VERTICAL
AIR-SPEED INDICATION AND CONTROL
Filed May 25, 1946
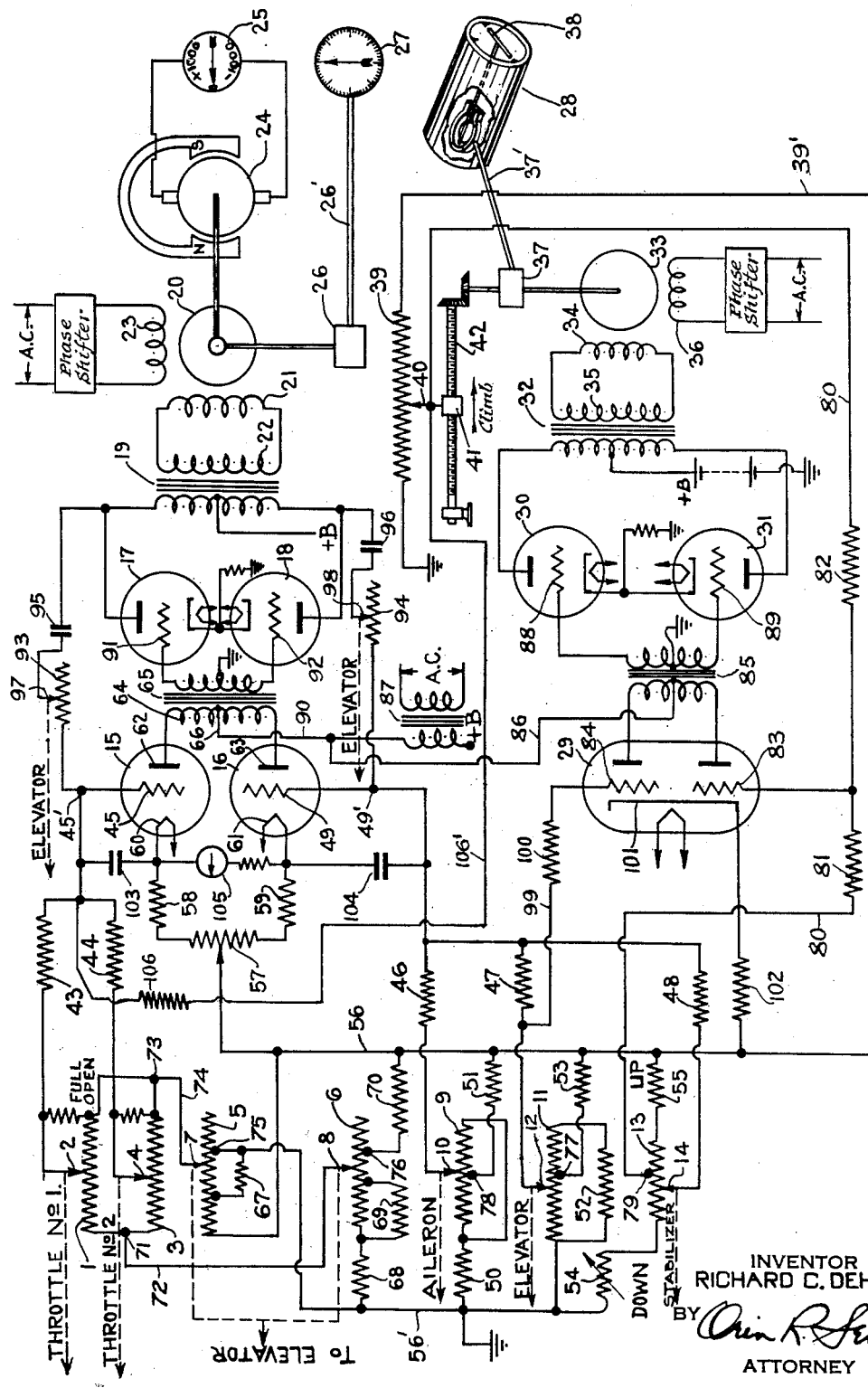
INVENTOR
RICHARD C. DEHMEL
BY
ATTORNEY Patented Feb. 17, 1953

2,628,434

UNITED STATES PATENT OFFICE 2,628,434

AIRCRAFT TRAINING APPARATUS WITH VERTICAL AIR-SPEED INDICATION AND CONTROL

Richard Carl Dehmel, Short Hills, N. J.

Application May 25, 1946, Serial No. 672,210

14 Claims. (Cl. 35—12)

This invention relates to aircraft training apparatus such as grounded flight trainers, and more particularly to the indication and control of simulated vertical air-speed incident to climb, dive and maneuvers involving change in altitude.

An object of this invention is to provide improved flight training apparatus of the above character for indicating and controlling simulated vertical air-speed in accordance with the operation of the trainer controls.

A further object of this invention is to provide improved flight training apparatus of the electronic type for indicating climb and dive rate, altitude and pitch, and for controlling and indicating simulated vertical air-speed of a multiple-motor aircraft trainer in an accurate and realistic manner.

The invention will be more fully set forth in the following description referring to the accompanying drawing, and the features of novelty will be pointed out with particularity in the claims annexed to and forming a part of this specification.

Referring to the drawing, the single figure thereof is a diagrammatic and schematic illustration of an electro-mechanical system for a multiple-motor aircraft trainer embodying the present invention.

The diagrammatic representation of the trainer control circuits shown in the drawing does not in the interest of clearness include the trainer cockpit. However the simulated aircraft controls are represented by elements, such as movable electrical contacts which may be operatively connected in any suitable manner to the throttle, aileron, elevator and stabilizer respectively of the trainer. These aircraft controls may be for example of the character disclosed in my Patent No. 2,366,603, granted January 2, 1945, for "Aircraft Training Apparatus" so that a detail description thereof is unnecessary for a complete understanding of this invention.

In accordance with this invention a plurality of potentiometers are provided with slide contacts operated from the aircraft controls respectively, generally as disclosed in my above-identified patent, and the potentiometer voltages are applied individually and conjointly in various combinations to thermionic valves for controlling movable flight indicating elements which may represent vertical air-speed conditions including rate of climb-dive, altitude and pitch.

The flight potentiometers, referring to the drawing, comprise the throttle potentiometers 1 and 3, provided with slider contacts 2 and 4 respectively. The specific application is for a two-motored trainer, the contact 2 being connected for movement with the throttle of the No. 1 motor and the contact 4 being connected for movement with the throttle of the No. 2 motor. The potentiometers 5 and 6 having slider contacts 7 and 8 respectively are termed "throttle modifying" potentiometers and the contacts 7 and 8 thereof are connected to the elevator of the trainer for controlling the potentials impressed on the throttle potentiometers in a manner hereinafter described. The aileron potentiometer 9, the elevator potentiometer 11 and the stabilizer potentiometer 13 are provided respectively with slider contacts 10, 12 and 14 for operation by the respective aircraft controls as indicated.

In the present application only those controls that materially affect vertical air-speed are involved, such as the aileron, elevator, stabilizer and throttle, and these controls are used in the manner above indicated to operate respective potentiometers, the voltages of which are applied selectively in a manner hereinafter described to control a pair of electron tubes 15 and 16, which in turn control a pair of power tubes 17 and 18 for operating through a transformer 19 the altimeter and rate of climb-dive indicating apparatus. This apparatus may comprise a two-phase motor 20, one winding 21 of which is connected to the secondary winding 22 of the transformer 19, and the other winding 23 to a source of commercial alternating current, the phase of which for present purposes has been shifted 90 degrees by suitable phase shifting apparatus. The motor is connected to a generator 24 across the terminals of which is connected a voltmeter 25 of the center-zero type calibrated in terms of rate of climb and dive. The motor is also directly connected through a reduction gearing 26 and shaft 26' to a mechanical integrating device 27 for indicating altitude. The electron tubes are controlled by the potentiometer voltages so that when the trainer controls are manipulated to simulate a diving maneuver for example, the motor 20 is energized to rotate in a direction to show rate of dive at the instrument 25 and decreasing altitude at the instrument 27.

The pitch element of the artificial horizon 28 is also controlled by the aileron, elevator and stabilizer potentiometers through the twin tube 29, power tubes 30 and 31, output transformer 32 and the two-phase motor 33. One motor winding 34 is connected across the secondary coil 35 of the transformer 32 and the other winding 36 is connected to said source of commercial A. C., the phase of which has also been shifted 90 degrees. The motor is mechanically connected through a reduction gearing 37 and shaft 37' to the pitch element 38 of the artificial horizon. The banking control of the artificial horizon which may be of the character disclosed in my aforesaid patent is not involved in the present invention and therefore is not shown. The motor 33 also controls a balancing high resistance potentiometer 39 for a purpose hereinafter described, the potentiometer slider contact 40 being carried by a traveling nut 41 on the motor-driven lead screw 42.

There are certain flight characteristics of aircraft that must be taken into consideration in the design of ground trainers if aircraft performance under actual operating conditions is to be realistically simulated. For example, further opening of the throttle or throttles when the craft is at cruising speed in level flight causes the craft to nose upward slightly and climb unless the elevator is readjusted, and, similarly, retarding the throttle causes the craft to lose altitude. There is also a tendency for the craft to delay its response to the elevator and then to maintain its motion once the climb or drive has started. An important design factor involves the magnitude and direction of thrust which affects the rate of climb and dive. This is dependent on both the throttle opening and the "angle of attack" of the aircraft which is in turn determined by the elecator position.

The specific potentiometer, electron tube, and associated circuits for simulating these and other characteristics of actual aircraft will now be described. The slider contacts 2 and 4 of the throttle potentiometers are connected in parallel through resistances 43 and 44, respectively, to junction 45' and the control grid 45 of the tube 15, and the slider contacts 10, 12 and 14 of the aileron, elevator, and stabilizer potentiometers are connected in parallel through resistances 46, 47, and 48 respectively, to junction 49' and the control grid 49 of the companion tube 16. It will therefore be seen that potentials respresentative of the total motor thrust and of the combined effect of the vertical controls are impressed on the tube grids respectively.

The aileron potentiometer 9 is connected to the balancing and sensitivity adjusting resistances 50 and 51, the elevator potentiometers 11 to similar resistances 52 and 53, and the stabilizer potentiometer 13 to similar resistances 54 and 55. The common terminal conductors 56 and 56' for supplying a direct-current voltage to the potentiometers are connected respectively to the cathodes of tubes 15 and 16, and to ground as indicated. Accordingly, the conductor 56 is supplied with a steady source of D. C. voltage derived from the conventional +B anode voltage through the tube circuits including the adjustable resistance 57, cathode resistances 58 and 59, cathodes 60 and 61, anodes 62 and 63, primary winding 64 of the output transformer 65 and center tap connection 66 which is connected to the anode potential +B. Therefore, since the conductor 56 and hence the aircraft control potentiometers are in the cathode-plate circuits of tubes 15 and 16, there will be voltage drop due to tube conduction across these potentiometers. Thus voltages can be derived from the potentiometers according to operation of the simulated aircraft controls for controlling the grids 45 and 49 of the aforesaid tubes. In the balanced level flight condition of the system, the grid bias is such that the tubes are normally conducting.

The voltage to the throttle potentiometers 1 and 3 is supplied by the slider contacts 7 and 8 of the throttle-modifying potentiometers 5 and 6 which are controlled by the elevator. The potentiometer 5 is shunted at its central portion by a resistance 67 and the potentiometer 6 is connected to the balancing and sensitivity adjusting resistances 68, 69 and 70.

The purpose of the throttle modifying potentiometers is to resolve the effectiveness of the throttles with respect to the vertical component of direction on climb and dive velocities. The modifying potentiometers which are combined with the throttle potentiometers to constitute a computing network are used to introduce the fundamental concept of the "angle of attack" as a computing parameter. Specifically, the throttle voltage is modified in accordance with the "angle of attack" as determined by the elevator position so that the network in question computes the direction of thrust to determine the lift as affecting the climb-dive circuit so as to cause corresponding variation in the climb-dive action of the aircraft as indicated by the meter 25. When an aircraft in actual flight goes into a climb, for example, further opening of the throttle causes increase of vertical air speed up to a certain critical angle of climb. Beyond that point the vertical air speed decreases, even though the throttle is opened full, and the result is a "mushing" flight terminating in a "stall," i. e., the vertical air speed approaches zero and the aircraft is in unstable condition. Also, in the case of a dive an increase in throttle may first cause very material increase in dive-rate as compared with the same throttle setting for a similar angle of climb; but the dive-rate may be actually retarded by open throttle during a very steep dive since the propeller than functions as a brake due to its slower relative speed.

It will therefore be seen that the throttle potentiometer voltages must be modified or even reversed under certain conditions in order that the proper control potentials may be applied to the electron tubes. To this end, the throttle potentiometers 1 and 3 which jointly control the grid bias of tube 15 are connected in parallel and the common terminal 71 is connected by conductor 72 to slider contact 8 and the common terminal 73 is connected by conductor 74 to slider contact 7. The potentiometer 5 is connected at an intermediate point 75 to the grounded lead 56' and at the left terminal to the positive supply lead 56, whereas the left terminal of the potentiometer 6 is connected to the grounded lead 56' and an intermediate junction point 76 to the supply lead 56. Since the slider contacts 7 and 8 are moved in unison by the elevator control, it will be seen that as the control moves toward the right to simulate climb, for example, the potential at the throttle terminal 71 gradually increases and the potential at the terminal 73 decreases. When the points 75 and 76 are reached the maximum potential is impressed across the throttle potentiometers so that the potential starts to reverse when the slider contacts are moved further toward the right. This operation simulates generally the conditions incident to critical angle of climb above referred to. It will be noted that the throttle potential is practically reversed between the elevator positions of full dive and full climb.

The adjusting and compensating resistances connected to the modifying potentiometers 5 and 6 may be so connected and chosen as to produce the desired gradation of throttle potential. For example, the resistance 67 maintains the slider 7, and hence throttle terminal 73, comparatively negative when the elevator is at or near its neutral level-flight position, whereas the potential of the companion slider 8, and hence throttle terminal 71, may vary materially within the same range of elevator operation. Accordingly the joint effect of the throttle potentials at the control grid of tube 15 corresponds to the actual effect of opening or closing the throttle for different conditions of climb or dive, which in turn are simulated by the joint effect of the aileron, elevator and stabilizer potentiometers at the control grid of the companion tube 16. For example, with the throttles set for "cruising speed" and the other controls in normal level flight position, the voltage on grid 45 of tube 15 must balance the voltage on grid 49 of tube 16 in order that there be no power output at the tubes 17 and 18 for operating the altitude motor 20.

The circuit connections for the aileron and elevator potentiometers are essentially the same as those disclosed in my aforesaid patent providing for realistic simulation of actual aircraft behavior and therefore can be described briefly. For example, continued back-pressure on the elevator control, i. e., for climbing, causes movement of slider contact 12 to the right so as to increase the slider potential until it is near the junction 77. Up to this point the altitude motor 20 has been operating in the direction of increasing altitude. Continuation of back elevator pressure moves the slider past the junction 77 so as to cause the slider potential to decrease and become more negative, due to the connection including grounded resistance 52, thereby decreasing the speed of the motor toward zero until a simulated stall occurs. The aileron potentiometer 9 also includes an intermediate junction 78 cooperating with the slider 10 so that like characteristics are simulated during a steep right or left bank during which the aircraft loses altitude.

The stabilizer potentiometer 13 includes an intermediate constant potential junction 79 that is connected to the control grid 83 of the twin tube 29 through a conductor 80 and resistance 81 which in turn is connected to the motor operated contact 40 through conductor 80 and a high resistance 82. Since the high resistance potentiometer 39 is connected by conductor 39' to the positive supply conductor 56 and at its other terminal to ground, a matching potential which varies with the position of the artificial horizon is therefore impressed on the control grid 83 of the twin tube 29. The other control grid 84 is directly connected to the elevator slider 12 so that the tube 29 is controlled essentially by the elevator and stabilizer potentiometers. In other words, in order for the aircraft to be in proper "trim" so that the artificial horizon 38 is in the normal position illustrated, the potential impressed on the grid 83 due to position of contact 40 must balance the elevator potential impressed on the grid 84. Since the position of the artificial horizon above or below its normal position determines the position of the potentiometer contact 40, which in turn controls the potential on the grid 83, it will be seen that the artificial horizon can be returned to its normal position only by proper operation of the elevator so as to apply either greater or less potential to the grid 84 or by further adjusting the stabilizer slider 14. An unbalance between the grid potentials causes operation of motor 33 in a direction corresponding to the movement of the elevator control, thereby moving the contact 40 to a new position of balance on the potentiometer 39.

The power tube push-pull connections for causing operation of the motor 33 are essentially the same as those disclosed in my aforesaid patent and need not be described in detail, other than to point out that the primary winding of the transformer 85 is connected at its mid-point to a source of positive plate potential $+$B by conductor 86. This connection also includes a secondary winding of an A. C. power supply transformer 87. In this case the A. C. power is taken directly from the commercial mains so that it is 90 degrees out of phase with respect to the voltage supplied to the two motor windings 23 and 36. The secondary winding of the output transformer 85 is connected to the control grids 88 and 89 of the power tubes 30 and 31 respectively for controlling the phase and magnitude of the current delivered to the motor winding 34 in a manner well known in the art. The secondary of the supply transformer 87 is also connected by conductor 90 to the middle tap 66 of the primary winding 64 of the signal tube output transformer 65, the secondary of which is grounded at its mid-portion and connected to the grids 91 and 92 of the power tubes 17 and 18. These power tubes likewise control the phase and magnitude of the current delivered to the motor winding 21 for operating the altitude motor 20 in a direction and at a speed corresponding to the signal potentials impressed on the grids of the tubes 15 and 16.

For the purpose of "holding" the trainer in a simulated climb or dive once it has started and maintaining directional stability, regenerative feed back between the output of the power tubes 17 and 18 and the control grids of the signal tubes 15 and 16 is provided and consists of variable resistances 93 and 94, connected between the primary winding terminals of the power tube output transformer 19 and the signal grids 45 and 49 respectively. The connections include isolating condensers 95 and 96 and slider contacts 97 and 98 respectively which are movable in unison by the elevator control. It will be noted that the regenerative feed back is a maximum when the elevator slider contacts are positioned at the extreme left, i. e., full diving position, thereby simulating not only the greater vertical air speed of a dive but also the stronger tendency of the aircraft to remain in a dive.

The operation of the trainer system is as follows: Let it first be assumed that the controls are positioned for level flight at cruising speed. In this case the resultant throttle potential representing the added thrust of both motors impressed on the grid 45 of signal tube 15 and the resultant aileron, elevator and stabilizer potential impressed on the grid 49 of the signal tube 16 exactly balance each other. Accordingly the anode currents flowing in the respective halves of the primary transformer winding 64 are equal and opposite so that the voltage across the secondary winding is zero and no control voltage is impressed on the grids of the power tubes 17 and 18. The altitude motor 20 therefore remains stationary and the meters 25 and 27 show no vertical air speed or change in altitude.

At the same time the artificial horizon 28 indicates level flight in a similar manner. The grid 84 of the signal tube 29 is connected to the elevator slider by a conductor 99 including a resistance 100, and the grid 83 is connected to the central tap 79 of the stabilizer potentiometer and also to the balancing potentiometer slider 40 as previously described. The cathode 101 is connected through a resistance 102 to the supply conductor 50 in the manner of the cathodes of tubes 15 and 16. Accordingly, with the artificial horizon element 38, and hence the balancing slider 40 in a given position, the elevator potential impressed on the grid 84 is balanced during level flight by the slider potential impressed on the grid 83.

When this condition obtains, the anode currents in the primary of transformer 85 are equal and opposite and no control voltage appears across the terminals of the secondary winding for operating the power tubes 30 and 31. Consequently the servo-mechanism including the motor 33 remains stationary and the artificial horizon continues to indicate the level of flight set by the elevator.

Now let it be assumed that back pressure is applied to the elevator control, i. e., elevator slider 12 is moved toward the right in preparation for climbing. This causes the elevator slider 12 to become more positive as it moves toward the junction 77, thereby tending to unbalance the grid voltages at 15 and 16. At the same time the elevator-operated potentiometers 5 and 6 increase the potential difference across the throttle potentiometers but without materially changing the slider potentials, i. e., the potential at terminal 73 becomes more negative, while that at terminal 71 becomes more positive, resulting in little change in the intermediate positions. However, if the throttles are opened further to increase the rate of climb, the throttle sliders become more negative, thereby tending further to unbalance the grid potentials. This unbalance results in greater flow of anode current in tube 16 and less flow in tube 15, so that the primary currents of transformer 65 no longer are equal and a control voltage appears across the secondary, depending in phase and magnitude on the dominant anode current. The resulting output current from the push-pull connected tubes 17, 18 energizes the transformer 19 and motor winding 21 so as to operate the altitude motor 20 in a direction to show rate of climb and increasing altitude.

In the opposite case, i. e., the dive, the anode current in tube 15 is dominant, due to decrease of elevator potential at grid 49 so that the phase of the current in motor winding 21 is now displaced 180 degrees as compared with the previous case. The motor 20 now rotates in the opposite or decreasing altitude direction. It will be noted that in the intermediate or level flight position of the elevator the modifying potentiometers 5 and 6 impresses a minimum voltage across the throttle potentiometers, thereby simulating less vertical air speed in response to throttle control during level flight. The precise position where an increase in throttle shows but little change in vertical air speed is at a slight angle of dive. During these operations the regenerative feedback resistances 93 and 94 are adjusted in accordance with the elevator position so as to increase the tendency of the trainer to hold a climb or dive once it has started, this tendency being stronger in a dive, as previously stated.

In respect to turning and banking it will be noted that simulation of a right or left bank causes the aileron slider 10 to become more negative and the motor 20 to operate to show loss of altitude unless corrected by more throttle in order to lower the potential also at the throttle sliders and reestablish balance at the grids 45 and 49.

The stabilizer which functions through a limited range somewhat in the manner of the elevator is adjusted less frequently for maintaining the aircraft in level flight for different load conditions. As previously explained with reference to the artificial horizon the grid voltages at tube 29 are balanced by movement of the elevator and the follow-up balancing slider 40 so that a change in elevator position necessitates a change in position of the artificial horizon element 38 which corresponds to the position of slider 40. For example, movement of the elevator slider to the right for a climb makes the grid 84 more positive and causes the motor 33 to operate in a direction to lower the horizon element 38 and also to move the slider 40 toward the right thereby making it also more positive in order to balance the grid potentials. The rate at which the motor 33 is restored to its neutral or balanced position depends on the ratio of the resistances 82 and 81.

In practice, the climb-dive meter is corelated to the artificial horizon so that a certain delay in the climb-dive indication is apparent after the artificial horizon has moved from the neutral position to indicate climb or dive. For simulating this delay and for coordinating the instruments so as to give more stable operation, the resistance 106, which is included in a circuit common to both the operating means of the climb-dive meter and the artificial horizon pitch element is connected so as to provide a stabilizing influence on the artificial horizon and the climb-dive meter. Specifically, resistance 106 is connected by a conductor 106' between the grid terminal 45' of the tube 15 and the balancing slider 40 which takes a voltage from the resistance 39, so as to control energization of the climb-dive circuit in corelation with the artificial horizon, the characteristic delay in reaction being determined by the value of the resistance 106 and condenser 103. Accordingly, this common connection including resistance 106 constitutes a "tie-in" which functions as the artificial horizon becomes unbalanced to introduce a position-adjusting voltage to the tube 15 tending to bring the climb-dive meter 25 to a corelated indication. For example, if the pitch element 38 moves above the neutral position indicating a climb position corresponding to the increased potential at the twin tube grid 84, the motor 33 moves slider contact 49 to the right until the potential at the balancing grid 83 also increases to a corresponding amount. Meanwhile the increasingly positive potential from the resistance 106 is not applied instantly to the tube 15 as above pointed out due to the R-C combination of resistance 106 and condenser 103 with the result that there is no instantaneous indicated change at the climb-dive rate meter 25 and altimeter 27.

When the air speed is increased during a dive the "center of lift" is caused to move forward thereby increasing the "angle of attack" and establishing an upward pitching moment acting on the aircraft causing it to seek a more nearly level flight attitude. The circuit including the high resistance 106 functions in the manner above indicated to simulate this "leveling off" characteristic of aircraft when the elevator pressure is decreased during a climb or dive. An opposing potential taken from resistance 106 is held on the grid 45 tending to oppose the actuating signal on the grid derived from the throttle control, thereby causing the climb motor 20 to slow down and stop. For example, in a climb the throttle potential at terminal 45' is negative but this is opposed by a positive potential from slider 40 and resistance 106 tending to restore balance to the tubes 15 and 16 as the elevator pressure is relaxed and grid 49 becomes less positive. This circuit also simulates in a similar manner the tendency of the aircraft to "nose down" when the elevator pressure is decreased during a climbing maneuver.

For the purpose of simulating characteristic climb-dive delay in response to the aircraft controls, condensers 103 and 104 are connected each between a grid and cathode of the respective signal tube 15 or 16 so as to form R-C combinations with the slider resistances 43, 44, etc. as described in my aforesaid patent.

It will be noted that the operation of the above described stabilizing circuit is independent of the current output of the power tubes 17 and 18 thereby supplementing to a degree the operation of the feed-back stabilizing resistances 93 and 94 which are designed so as to retard the rate of decay of the input signal. The combined result is to give more stable operation.

As an alternative arrangement for indicating rate of climb-dive, a zero-center voltmeter 105 in series with a resistance may be connected between the cathodes of signal tubes 15 and 16 for indicating rate of climb or dive in place of the meter 25. The voltmeter is energized during differential operation of the tubes 15 and 16 in magnitude and in direction corresponding to the degree and sense of unbalance between the tubes. It will be understood that the voltmeter 105 may, if desired, be connected across other points subject to differential potentials representative of vertical air-speed, such as across a push-pull transformer winding for example.

It should be understood that this invention is not limited to specific details of construction and arrangement thereof herein illustrated, and that changes and modifications may occur to one skilled in the art without departing from the spirit of the invention.

What is claimed is:

1. Flight training apparatus of the type operable by simulated aircraft controls comprising a computing network including voltage deriving means adapted for operation by an elevator control for deriving a voltage representing lift acting on the aircraft, means for modifying said control voltage in accordance with operation of a throttle control for affecting magnitude of said lift, additional voltage deriving means also operated according to the positioning of said elevator control, a pitch indicating element of an artificial horizon, vertical air speed indicating means, and means including an electro-mechanical system responsive to control voltages from all said voltage deriving means for operating said pitch element and said vertical air speed indicating means, said system including in addition to said elevator control electrical means interconnecting the operating means of said pitch element and said indicating means for corelating the indications thereof.

2. Flight training apparatus of the type operable by simulated aircraft controls including elevator and throttle controls comprising voltage deriving means controlled in accordance with the positioning of the elevator control for deriving a voltage representing lift, means energized according to said lift voltage and operable according to positioning of said throttle control for modifying said lift voltage, a power source, an electro-mechanical circuit including electronic valve means connected to said source and energized in accordance with said modified lift voltage for controlling vertical air speed indicating means as to magnitude and sense of direction, a pitch element of an artificial horizon, a second electro-mechanical circuit including electronic valve means connected to said source and responsive to the operation of said elevator control for positioning said pitch element, and electrical means interconnecting said electro-mechanical circuits for coordinating the indications of said vertical air speed indicating means and said pitch element.

3. Flight training apparatus of the type operable by simulated aircraft controls comprising voltage deriving means controlled in accordance with the positioning of aircraft control affecting the vertical air speed of the aircraft for deriving control voltages, a power source, an electro-mechanical circuit including electronic valve means connected to said source and energized in accordance with voltages from said deriving means for controlling in accordance with vertical air speed maneuvers vertical air speed indicating means as to magnitude and sense of direction, a pitch element of an artificial horizon, an electro-mechanical circuit including electronic valve means connected to said source and associated with said voltage deriving means for controlling said pitch element, and a biasing circuit including a resistance common to the said electro-mechanical circuits for coordinating the indications of said vertical air speed indicating means and said pitch element.

4. Flight training apparatus of the type operable by simulated aircraft controls comprising voltage deriving means controlled in accordance with the positioning of aircraft controls affecting the vertical air speed of the aircraft for deriving control voltages, a power source, an electronic valve system connected to said source and controlled in accordance with voltages from said deriving means for controlling vertical air speed indicating means as to magnitude and sense of direction, a pitch element of an artificial horizon, means for deriving a balancing voltage in accordance with the positioning of said element, means including an electronic valve system connected to said source and energized in accordance with a voltage from said deriving means and said balancing voltage for positioning said pitch element, and biasing means common to said electronic valve systems and controlled in accordance with the positioning of said pitch element for coordinating the indications of said indicating means and said pitch element.

5. Flight training apparatus of the type operable by simulated aircraft controls comprising voltage deriving means controlled in accordance with the positioning of elevator and throttle controls for deriving control voltages, a power source, electronic valve means connected to said source and energized according to voltages from said deriving means for controlling vertical air speed indicating means as to magnitude and sense of direction, a pitch element of an artificial horizon and motive means for positioning said element, means for deriving a balancing voltage in accordance with the positioning of said element, a second electronic valve means connected to said source and energized jointly by a voltage from said deriving means and said balancing voltage for controlling said pitch element, and biasing means interconnecting said electronic valve means for introducing a potential corresponding to said balancing voltage in the circuit of said first named electronic valve means so as to coordinate the indications of said indicating means and said pitch element.

6. Flight training apparatus of the type operable by simulated aircraft controls comprising voltage deriving means controlled in accordance with the positioning of elevator and throttle controls for deriving control voltages representing magnitude of lift and angle of attack of the aircraft, a power source, electronic valve means connected to said source and energized according to said voltages for controlling vertical air speed indicating means as to magnitude and sense of direction, a pitch element of an artificial horizon and a servo-motor for positioning said element, means for deriving a balancing voltage in accordance with the positioning of said element, a second electronic valve means connected to said source and energized according to one of said control voltages and said balancing voltage for controlling said pitch element, and a biasing circuit interconnecting said balancing voltage deriving means and said first named electronic valve means for modifying the lift control voltage so as to coordinate the indications of said indicating means and said pitch element during climb and dive maneuvers and thereby simulate recovery characteristics of aircraft.

7. Flight training apparatus of the type operable by simulated aircraft controls comprising an angle of attack computing network including voltage deriving means controlled by both a throttle control and an elevator control, one of which modifies the operation of the other for deriving a voltage representing the magnitude and direction of lift acting on the aircraft, voltage deriving means operated in accordance with the positioning of vertical air speed control, vertical air speed indicating means and means including an electro-mechanical system controlled according to variations in said lift voltage and a voltage from said last-named deriving means for operating said vertical air speed indicating means, said electro-mechanical system including a feed-back control operable according to angle of attack as determined by elevator control for simulating climb-dive characteristics of aircraft.

8. Flight training apparatus of the type operable by simulated aircraft controls comprising voltage deriving means controlled in accordance with the positioning of controls affecting vertical air speed of the aircraft, a source of alternating current, a two-phase motor, a vertical air speed indicating instrument positioned by said motor, means including electronic valve means connected to said source and to said voltage deriving means for controlling in accordance with vertical air speed maneuvers the magnitude and sense of power current in one winding of said motor the other winding of which is energized from said source, a pitch element of an artificial horizon, a two-phase motor for positioning said element, means including electronic valve means also controlled by voltages determined according to positioning of controls affecting vertical air speed and connected to said source for controlling the magnitude and sense of the power current in one winding of said pitch element motor the other winding of which is energized from said source, and electrical balancing means for coordinating the operation of said motors so as to adjust in corelated manner said vertical air speed instrument when said pitch element is unbalanced.

9. Flight training apparatus of the type operable by simulated aircraft controls comprising voltage deriving means operable by said controls, a climb-dive indicator, motive means for operating said indicator, electronic valve means responsive to said voltage deriving means for controlling said motive means, a pitch indicating element of an artificial horizon, a servo-motor for positioning said pitch element, voltage deriving means operated by said servo-motor for deriving a voltage representing the position of said pitch element, said voltage deriving means being responsive to the positioning of aircraft vertical control for deriving a pitch position control voltage, electronic valve means responsive to variations in said control voltages for controlling said servo-motor and positioning said pitch element in accordance with the aforesaid pitch position of said aircraft, and means for applying a modifying voltage corresponding to the servo derived voltage to the first-named electronic valve means for causing the indication of said climb-dive meter to be corelated to the unbalance of said pitch element whereby climb-dive characteristics of aircraft are simulated.

10. Flight training apparatus of the type operable by simulated aircraft controls comprising voltage deriving means including potentiometers operated by throttle and elevator controls respectively for deriving a pair of control voltages, electronic valve means controlled according to variations in said voltages, a climb-dive indicator responsive to the operation of said valve means, a pitch indicating element of an artificial horizon, a servo-motor for positioning said pitch element, voltage deriving means operated by said servo-motor for deriving a voltage representing the position of said pitch element, said voltage deriving means operable in accordance with the positioning of aircraft vertical control for deriving a pitch position control voltage, means controlled jointly by said control voltages for controlling said servo-motor and positioning said pitch element in accordance with the aforesaid pitch position of said aircraft, and a biasing connection between said servo voltage deriving means and said electronic valve means arranged so that the control voltage derived according to throttle control is modified by a voltage corresponding to the servo derived voltage whereby said climb-dive indicator tends to seek its neutral position in response to change in the elevator derived voltage corresponding to decreased elevator pressure.

11. Flight training apparatus of the type operable by simulated aircraft controls comprising voltage deriving means controlled in accordance with the positioning of elevator and throttle controls for deriving control voltages representing magnitude of lift and angle of attack of the aircraft, a power source, electronic valve means connected to said source and energized according to said voltages for controlling vertical air speed indicating means as to magnitude and sense of direction, a pitch element of an artificial horizon and a servo-motor for positioning said element, means for deriving a balancing voltage in accordance with the positioning of said element, a second electronic valve means connected to said source and energized according to one of said control voltages and said balancing voltage for controlling said pitch element and an electric circuit interconnecting said first and second electronic valve means for co-relating the operation of said vertical air speed indicating means and said pitch element.

12. Flight training apparatus of the type operable by simulated aircraft controls for indicating altitude and vertical air speed comprising an angle of attack computing network having means responsive to operation of an elevator control for deriving a lift control voltage, means for modifying the effectiveness of said lift control voltage in accordance with the operation of a throttle control for simulating change in lift, an altitude indicator, integrating means operable according to the modified effectiveness of said control voltage for operating said altitude indicator, a vertical air speed indicator also operable according to the modified effectiveness of said control voltage, a pitch indicator, servo means responsive to operation of the elevator control for controlling said pitch indicator, and means controlled in accordance with the position of said pitch indicator for further modifying the effectiveness of said control voltage for coordinating the indications of said vertical air speed and pitch indicators.

13. Flight training apparatus of the type operable by simulated aircraft controls comprising voltage deriving means controlled in accordance with the positioning of simulated throttle and elevator controls for deriving control voltages, an electro-mechanical circuit including electronic valve means responsive to control voltages from said deriving means for controlling in response to simulated vertical air speed maneuvers vertical air speed indicating means as to magnitude and sense of direction, a pitch element of an artificial horizon, a second electro-mechanical circuit including electronic valve means also responsive to control voltages from said deriving means for positioning said pitch element, a resistance variable according to the positioning of said pitch element, and a circuit including said resistance interconnecting said electro-mechanical circuits for coordinating the indications of said vertical air speed indicating means and said pitch element.

14. Flight training apparatus of the type operable by simulated aircraft controls comprising voltage deriving means controlled in accordance with the positioning of simulated throttle and elevator controls for deriving a plurality of control voltages, an electro-mechanical circuit including electronic valve means responsive to control voltages from said deriving means for controlling vertical air speed indicating means as to magnitude and sense of direction, a pitch element of an artificial horizon, a second electro-mechanical circuit including electronic valve means and servo motor means also responsive to control voltages from said deriving means for positioning said pitch element, and a circuit interconnecting said electro-mechanical circuits including a resistance variable according to the operation of said servo-motor for coordinating the indications of said vertical air speed indicating means and said pitch element.

RICHARD CARL DEHMEL.

REFERENCES CITED

The following references are of record in the file of this patent:

UNITED STATES PATENTS

| Number | Name | Date |
| --- | --- | --- |
| 502,399 | Haskins | Aug. 1, 1893 |
| 2,040,086 | Goodwillie | May 12, 1936 |
| 2,123,142 | McMaster | July 5, 1938 |
| 2,126,910 | Moseley | Aug. 16, 1938 |
| 2,149,756 | Arenberg et al. | Mar. 7, 1939 |
| 2,244,369 | Martin | June 3, 1941 |
| 2,352,953 | Haight | July 4, 1944 |
| 2,366,603 | Dehmel | Jan. 2, 1945 |
| 2,395,477 | Gumley | Feb. 26, 1946 |
| 2,428,767 | Albert | Oct. 14, 1947 |
| 2,450,261 | West | Sept. 28, 1948 |